US008447318B1

(12) United States Patent
Oroskar (10) Patent No.: US 8,447,318 B1
(45) Date of Patent: May 21, 2013

(54) ASSIGNING MULTIPLE TRAFFIC CHANNELS TO A WIRELESS COMMUNICATION DEVICE BASED ON TRAFFIC CHANNEL UTILIZATION

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 247 days.

(21) Appl. No.: 13/011,028

(22) Filed: Jan. 21, 2011

(51) Int. Cl.
*H04W 72/00* (2009.01)

(52) U.S. Cl.
USPC ..... 455/453; 455/452.1; 455/442; 455/432.1; 455/450; 370/329; 370/331; 370/332

(58) Field of Classification Search
USPC .................. 455/453, 450, 452.1, 442, 432.1, 455/443, 445, 448, 458, 464; 370/329, 331, 370/332, 341
See application file for complete search history.

(56) References Cited

U.S. PATENT DOCUMENTS

| 5,978,463 | A | 11/1999 | Jurkevics et al. | |
|---|---|---|---|---|
| 6,223,042 | B1 | 4/2001 | Raffel | |
| 6,295,451 | B1 * | 9/2001 | Mimura | 455/436 |
| 6,963,750 | B1 | 11/2005 | Cheng et al. | |
| 2004/0224719 | A1 * | 11/2004 | Nounin et al. | 455/553.1 |
| 2009/0061854 | A1 | 3/2009 | Gillot et al. | |
| 2009/0247137 | A1 | 10/2009 | Awad | |

OTHER PUBLICATIONS

TIA Standard, "Interoperability Test Specification for cdma2000® Air Interface," TIA-1036, Section 3.11, Jan. 2005.
TR45, "Inter-Operability Specification (I0S) for CDMA 2000 Access Network Interfaces," TIA/EIA/IS-2001-A, Sections 2.2.2.2, 3.4.1, 3.4.3.1.11, and 3.4.9, Jun. 2001.

* cited by examiner

*Primary Examiner* — Kamran Afshar
*Assistant Examiner* — Marisol Fahnert

(57) ABSTRACT

Multiple traffic channels may be assigned to a wireless communication device (WCD) at the beginning of the call in order to improve initial call quality. However, doing so when traffic channels are scarce can lead to traffic channel overuse. Therefore, methods, devices, and systems for assigning multiple traffic channels to a WCD based on traffic channel utilization are presented. During call establishment, a radio access network (RAN) may assign fewer traffic channels to a WCD when traffic channel utilization is high. On the other hand, the RAN may assign more traffic channels to the WCD when traffic channel utilization is low.

19 Claims, 6 Drawing Sheets

ASSIGNING MULTIPLE TRAFFIC CHANNELS TO A WIRELESS COMMUNICATION DEVICE BASED ON TRAFFIC CHANNEL UTILIZATION

BACKGROUND

Some types of wireless network technologies, such as Code Division Multiple Access (CDMA) technologies, allow a wireless communication device (WCD) to communicate via multiple wireless coverage areas simultaneously. For example, a radio access network (RAN) may transmit copies of the same bearer data to the WCD via traffic channels from each of several wireless coverage areas. This approach can increase the likelihood that the WCD will receive at least one copy of the bearer data. Additionally, the WCD may be able to combine two or more received copies of the bearer data such that the WCD can decode the received bearer data more reliably than if the WCD received only one copy of the bearer data. An analogous procedure may be used for bearer data transmitted by the WCD.

The wireless coverage areas with which a WCD is actively communicating may be referred to as the WCD's active set. As the WCD moves from place to place, or as the signal strengths that the WCD receives from members of its active set fluctuate, the RAN may add members to or remove members from the active set. The process of doing so may be referred to a "soft handoff."

While soft handoff procedures are typically used mid-call, the RAN may also be able to assign traffic channels from multiple wireless coverage areas to a WCD at the beginning of a call. This technique, sometimes referred to as channel assignment into soft handoff (CASHO), may improve initial call quality, thereby increasing user satisfaction with the wireless service.

OVERVIEW

A potential downside to CASHO is that it may cause a scarcity of traffic channels when a RAN is busy. For example, when the RAN experiencing high traffic channel utilization (e.g., 80% or more), it may be advantageous to limit the number of traffic channels assigned to a WCD during call establishment. Doing so may increase the likelihood that traffic channels from any given wireless coverage area are available when needed by a WCD. However, as traffic channel utilization decreases, the number of traffic channels assigned during call establishment may be increased. By maintaining an inversely proportional relationship between traffic channel utilization and traffic channels assigned during call establishment, the RAN may be able to reduce traffic channel utilization during periods of heavy load, but increase the initial quality of calls during periods of lighter load.

Accordingly, in a first example embodiment, a RAN may obtain an aggregate traffic channel utilization measurement of a plurality of wireless coverage areas. If the obtained aggregate traffic channel utilization measurement meets a traffic channel utilization threshold (e.g., the traffic channels are heavily loaded), the RAN may select a first extent of traffic channels from the plurality of wireless coverage areas. However, if the obtained aggregate traffic channel utilization measurement does not meet the traffic channel utilization threshold (e.g., the traffic channels are not heavily loaded), the RAN may select a second extent of traffic channels from the plurality of wireless coverage areas. The second extent may be greater than the first extent. Then, during establishment of a call the in which the WCD participates, the RAN may assign a respective traffic channel from each wireless coverage area in the selected set to the WCD. The WCD may use the respective traffic channels to communicate with the RAN during at least an initial portion of the call.

In this first example embodiment, the RAN considers the traffic channel utilization over a plurality of wireless coverage areas when determining the extent of traffic channels to assign during CASHO procedures. However, instead of or in addition to this approach, the RAN may consider the traffic channel utilization of one or more individual wireless coverage areas.

Therefore, in a second example embodiment, a RAN may obtain an aggregate signal strength measurement of a set of one or more wireless coverage areas. This aggregate signal strength measurement may be based on signal strengths, as received by a WCD, of wireless coverage areas in the set. These wireless coverage areas may be candidates for allocation of traffic channels to the WCD during a CASHO operation.

The RAN may determine that the aggregate signal strength measurement does not meet a minimum aggregate signal strength, and, perhaps as a result of this determination, the RAN may obtain a traffic channel utilization measurement of an additional wireless coverage area that could be added to the set. In other words, the RAN may conclude that the wireless coverage areas in the set may not provide a strong enough signal to the WCD. Consequently, the RAN may consider including the additional wireless coverage area to the set in order to improve initial call quality. However, the RAN may do so, for instance, only if the traffic channel utilization of the additional wireless coverage area is sufficiently low.

Therefore, based at least on the obtained traffic channel utilization measurement not meeting a traffic channel utilization threshold, the RAN may include the additional wireless coverage area in the set. Then, during establishment of a call in which the WCD participates, the RAN may assign, to the WCD, a respective traffic channel from each wireless coverage area in the set. Consistent with CASHO, the WCD may subsequently use the respective traffic channels to communicate with the RAN during the call.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
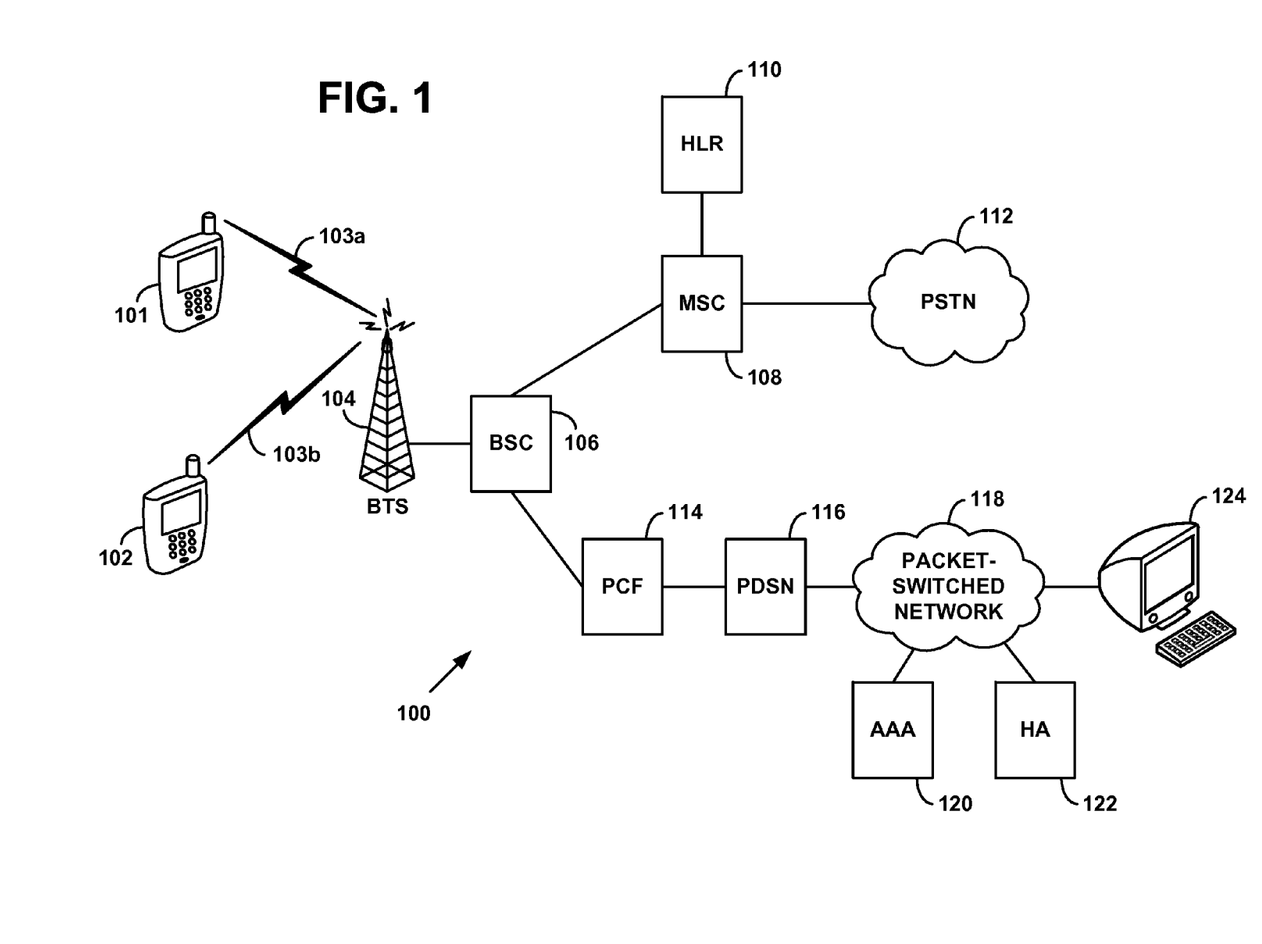
FIG. 1 depicts a RAN, in accordance with an example embodiment.

FIG. 1 is a simplified block diagram of a wireless communication system 100 in which example embodiments can be employed. WCD 101 may communicate over an air interface 103*a* with a base transceiver station (BTS) 104, which is, in turn, coupled to or integrated with a base station controller (BSC) 106. Similarly, WCD 102 may communicate over an air interface 103*b* with BTS 104. Transmissions over air interface 103*a* from BTS 104 to WCD 101 and over air interface 103*b* from BTS 104 to WCD 102 may represent "forward links" to the WCDs. Conversely, transmissions over air interface 103*a* from WCD 101 to BTS 104 and over air interface 103*b* from WCD 102 to BTS 104 may represent "reverse links" from the WCDs.

BSC 106 may be connected to a mobile switching center (MSC) 108. BSC 106, MSC 108, or both, may act to control assignment of air interface traffic channels, and may provide access to wireless circuit-switched services such as circuit-voice and circuit-data services. As represented by its connection to public-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a Mobile Internet Protocol (mobile-IP) home agent (HA) 122, and a remote computer 124.

After acquiring a traffic channel over air interface 103*a*, WCD 101 may transmit a request to PDSN 116 for a connection to the packet data network. Then, following authentication of WCD 101 by AAA server 120, WCD 101 may be assigned an IP address by the PDSN or by HA 122, and may thereafter engage in packet-data communications with entities such as remote computer 124. Similar procedures may take place, via air interface 103*b*, for WCD 102.

Figure 2:
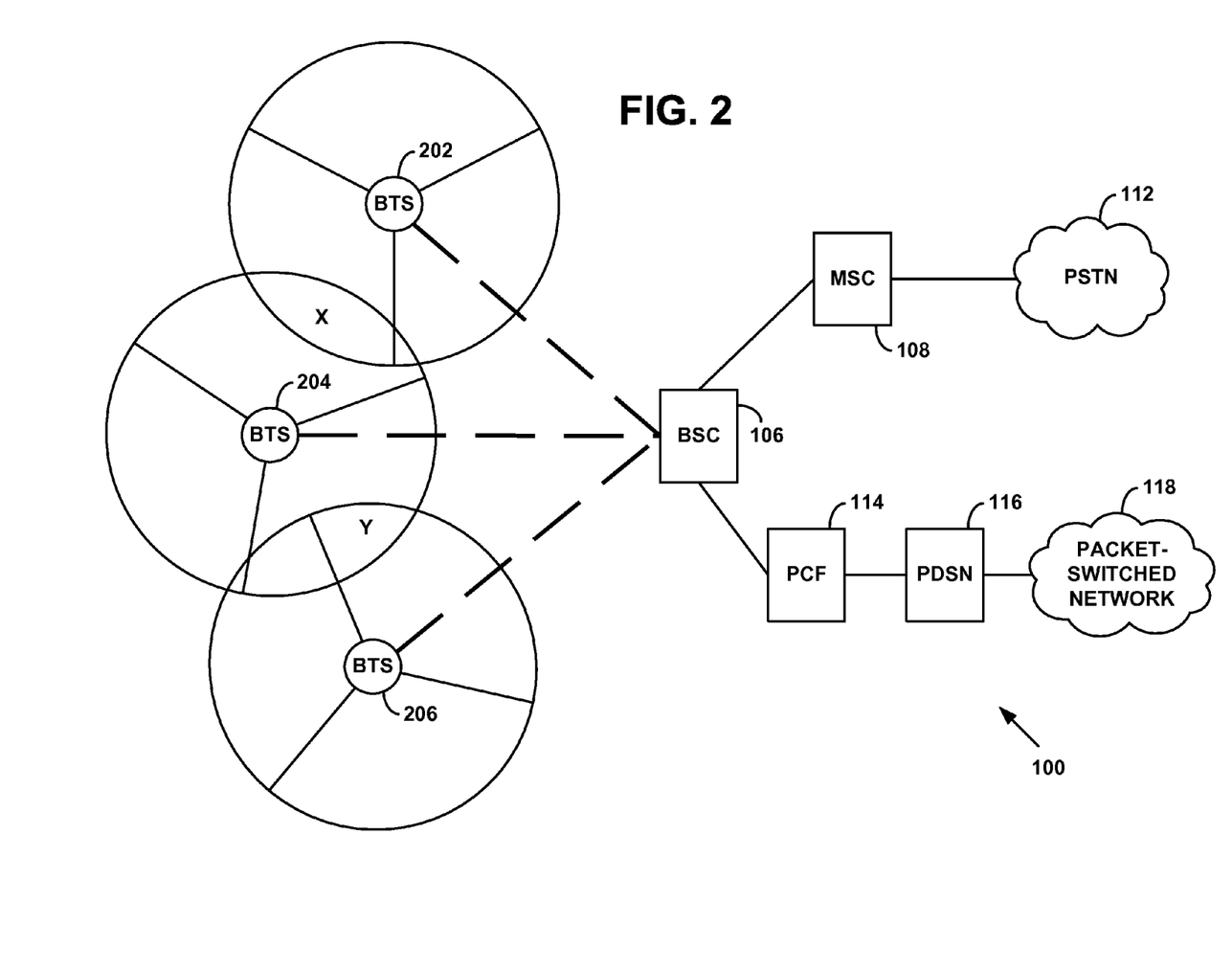
FIG. 2 depicts a RAN with several wireless coverage areas, in accordance with an example embodiment.

In practice, a BSC may serve multiple BTSs, each of which may define one or more wireless coverage areas. An example of such an arrangement is illustrated in FIG. 2, which shows BSC 106 in network 100 coupled with BTSs 202, 204, and 206. Each BTS is shown at the core of a respective circle representing wireless coverage, with each circle divided into three pie-shaped pieces representing individual wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas per BTS in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, a BTS's overall wireless coverage may not be circular, and may take on other shapes and arrangements instead.

A WCD may receive the same bearer data simultaneously from more than one wireless coverage area (herein the term "bearer data" inclusively refers to any form of circuit-switched or packet-switched voice, video, audio, text, graphics, or other type of information). To illustrate how this may occur, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals (and therefore simultaneously receive the same bearer data) from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangements shown in FIGS. 1 and 2 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
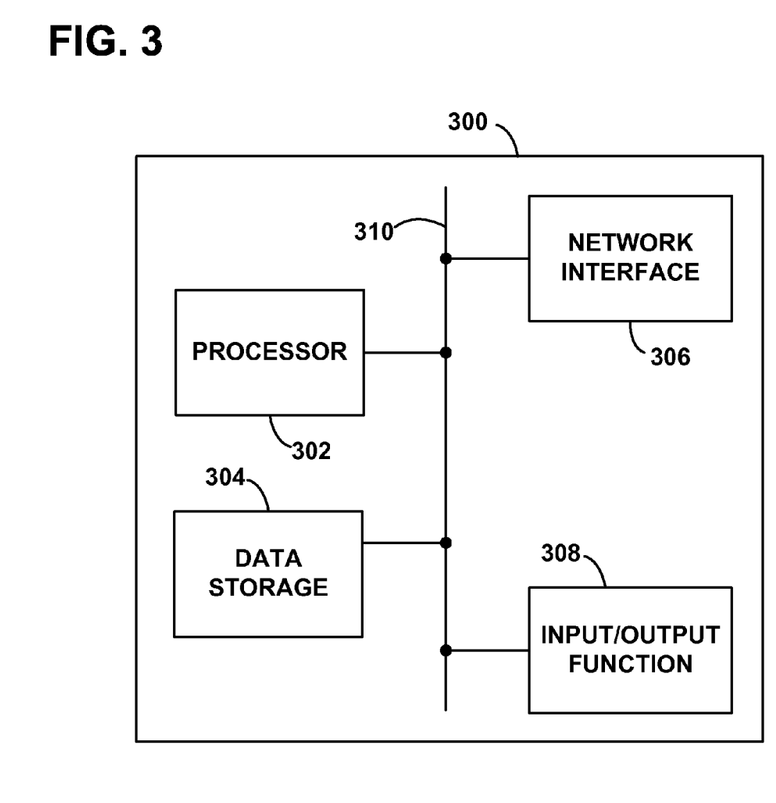
FIG. 3 is a block diagram of a RAN component, in accordance with an example embodiment.

FIG. 3 is a simplified block diagram exemplifying a RAN component 300, illustrating some of the functional elements that may be found in a RAN arranged to operate in accordance with the embodiments herein. RAN component 300 could be any type of device found in or associated with a RAN, such as a BTS, a BSC, or an MSC. For purposes of illustration, this specification may equate RAN component 300 to a BSC from time to time. Nonetheless, it should be understood that the description of RAN component 300 could apply to any component used for the purposes described herein.

RAN component 300 may include a processor 302, a data storage 304, a network interface 306, and an input/output function 308, all of which may be coupled by a system bus 310 or a similar mechanism. Processor 302 may include one or more CPUs, such as one or more general purpose processors and/or one or more dedicated processors (e.g., application specific integrated circuits (ASICs) or digital signal processors (DSPs), etc.)

Data storage 304, in turn, may comprise volatile and/or non-volatile data storage and can be integrated in whole or in part with processor 302. Data storage 304 may store program instructions, executable by processor 302, and data that is manipulated by these instructions to carry out the various methods, processes, or functions described herein. Alternatively, these methods, processes, or functions can be defined by hardware, firmware, and/or any combination of hardware, firmware and software. Therefore, data storage 304 may be a non-transitory computer-readable medium, having stored thereon program instructions that, if executed by a computing device, cause the computing device to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN component 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN component 300 may support remote access from another device, via network interface 306 or via another interface (not shown), such an RS-232 or Universal Serial Bus (USB) port.

II. CDMA Communications

The present invention will be described by way of example with reference to Code Division Multiple Access (CDMA) communications. However, it should be understood that the invention can apply to other families of protocols now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be assigned dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be assigned dynamically to WCDs for use as traffic channels.

a. Soft Handoff

During a call, a WCD may communicate via a number of "active" wireless coverage areas at the same time. Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

To facilitate a determination of which wireless coverage areas should be in the WCD's active and candidate sets, each BTS may emit a pilot channel signal per each wireless coverage area the respective BTS defines. The WCD may constantly, or from time to time, measure the strength of each pilot channel signal that it receives and may notify the RAN when a received pilot strength is above or below designated thresholds.

More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

b. Channel Assignment into Soft Handoff

Given the advantages of a WCD having more than one wireless coverage area in its active set, CASHO has been proposed, wherein a WCD can be assigned traffic channels from multiple wireless coverage areas during call initiation. Thus, using CASHO procedures may increase the quality of the initial portions of the WCD's calls.

When idle (i.e., not exchanging bearer data with the RAN), the WCD may register with a primary wireless coverage area, and listen to the paging channel of the primary wireless coverage area for incoming call indications, and other information, from the RAN. The RAN may transmit system parameter messages and/or neighbor list update messages to the WCD via this primary paging channel. These messages may contain PN offsets of the pilot channels emitted by BTSs that define neighboring wireless coverage areas (e.g., wireless coverage areas defined by the RAN's BTSs or wireless coverage areas defined by nearby BTSs in different RANs). Similar to an active WCD, an idle WCD may measure the pilot channel signal strength that it receives from each of these neighboring wireless coverage areas.

If, for some period of time, WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and register with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer data to the RAN on a reverse traffic channel by applying the WCD's assigned PN long code offset to a PN long code. The WCD may then modulate the bearer data according to the resulting point in the PN long code.

Figure 4:
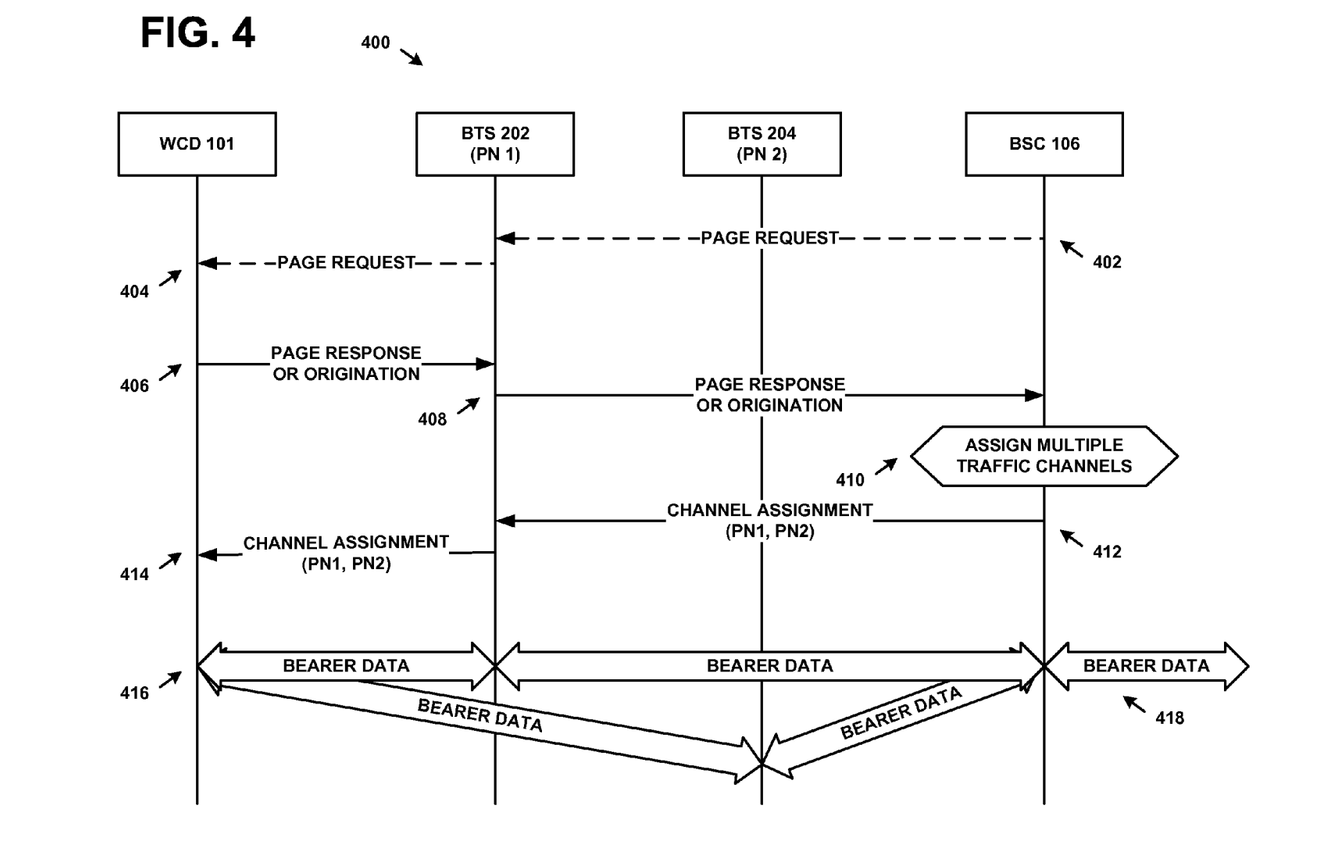
FIG. 4 is a message flow, in accordance with an example embodiment.

For purposes of illustration, FIG. 4 shows an example message flow 400 of CASHO procedures. FIG. 4 involves WCD 101, BTS 202, BTS 204, and BSC 106. BTS 202 defines a wireless coverage area with PN offset 1 ("PN 1"), and BTS 204 defines another wireless coverage area with PN offset 2 ("PN 2"). BTS 202 and BTS 204 are controlled by BSC 106. WCD 101 may be able to receive pilot channel signals of sufficient strength from both PN 1 and PN 2 such that WCD could communicate effectively via either of these wireless coverage areas. Preferably, WCD 101 reports, to BSC 106, the signal strengths at which WCD 101 receives the pilot channels of PN 1 and PN2. This reporting may occur through the transmission of radio environment reports or PSMMs, or via a different type of messages.

Steps 402 and 404 illustrate BSC 106, via BTS 202, transmitting an optional page request message to WCD 101. Such a page request message may be transmitted when WCD 101 is paged to answer an incoming voice call or to receive incoming data. Steps 406 and 408 illustrate WCD 101 transmitting a message via BTS 202 to BSC 106. This message may be a page response message transmitted on the access channel in response to the optional page request message. Alternatively, this message may be an origination message, also transmitted on the access channel, with which WCD 101 is attempting to establish an outgoing voice or data call. Additional alternative message types may also be used for this purpose, and any such message may be transmitted on the access channel or another type of channel.

Regardless of whether an incoming or outgoing call is being established for WCD 101, at step 410, BSC 106 may assign multiple traffic channels to WCD 101. In particular, BSC 106 may assign one traffic channel from PN 1, and another traffic channel from PN 2, to WCD 101, in accordance with CASHO procedures. When making the traffic channel assignment, BSC 106 may consider pilot channel signal strength measurements that it received from WCD 101. BSC 106 may receive these signal strengths in PSMMs, the page response or origination message of steps 406 and 408, or in some other type of message. In any case, BSC 106 may use these received signal strengths, and/or other information, when determining to perform CASHO procedures.

At steps 412 and 414, BSC 106 may transmit a "channel assignment message" (CAM), or an "enhanced channel assignment message" (ECAM), via BTS 202 to WCD 101. The CAM or ECAM may include traffic channel assignments for both PN 1 and PN 2. In other words, the CAM or ECAM may instruct WCD 101 to use a particular Walsh code to receive from PN 1 and another Walsh code to receive from PN 2. Accordingly, at steps 416 and 418, WCD 101 may begin transmitting and receiving bearer data via both BTS 202 (using PN 1) and BTS 204 (using PN 2). Thus, via both BTS 202 and BTS 204, WCD 101 may receive forward direction bearer data streams from BSC 106, and may combine these streams into a single stream of bearer data. This combining may involve WCD 101 adding the signals it receives from BTS 202 and BTS 204, to form a combined signal. Conversely, via both BTS 202 and BTS 204, BSC 106 may receive reverse direction bearer data streams from WCD 101, and may also combine these streams into a single stream of bearer data.

It should be understood that rather than traversing BTS 202, any of the page request messages, page response or origination messages, CAMs and/or ECAMs may instead traverse BTS 204. Further, the names of these messages are used for purposes of convenience and messages with other names may be used for similar purposes. Additionally, CASHO procedures may be performed such that more than two traffic channels are assigned to a WCD during call initiation.

III. Assigning Multiple Traffic Channels to WCDs Based on Traffic Channel Utilization Herein, a "utilization" may refer to a measurement of resource usage. Thus, a utilization of a communication channel may be a portion of the channel that is used by traffic. For example, if, over a period of time, a given channel is used by traffic half of the time, the channel can be said to have a utilization of 50%. On the other hand, a traffic channel that is assigned to a WCD may be considered to be fully utilized. Thus, the utilization of a wireless coverage area may be represented as a percentage of traffic channels in that wireless coverage area that are assigned to WCDs. While utilizations may be expressed as percentages, utilizations may alternatively be expressed in other ways as well.

CASHO generally improves call quality during the initial portion of a call. The more traffic channels assigned to a WCD during CASHO procedures, the more likely the WCD's initial call quality will improve. As a consequence, it is usually beneficial to assign as many traffic channels as possible during CASHO procedures.

On the other hand, if the RAN is busy (e.g., simultaneously serving a large number of active WCDs), traffic channel resources may be scarce. Some WCDs might not need to be assigned a large number of traffic channels (e.g., five or more) in order to have a sufficient initial call quality. Further, if the RAN assigns a large number of traffic channels to these WCDs during CASHO procedures, other WCDs may be unable to obtain a sufficient number of traffic channels.

For instance, another WCD may be unable to obtain any traffic channels, and consequently may be unable to participate in a call. But even if this WCD is able to participate in a call, the RAN may assign the WCD a small number (e.g., only one or two) traffic channels. If these assigned traffic channels are unable to provide sufficient call quality to the WCD, the WCD's call quality might suffer, even as nearby WCDs are assigned more traffic channels than they require.

Overall call quality may be improved if the RAN, during call establishment, allocates traffic channels to WCDs based on traffic channel utilization. For example, when the RAN is experiencing high traffic channel utilization (e.g., 80% or more), it may be advantageous to limit the number of traffic channels assigned during call establishment. Doing so may increase the likelihood that traffic channels from any given wireless coverage area are available when needed by a WCD.

Thus, as traffic channel utilization increases, the number of traffic channels assigned during call establishment should be decreased. However, as traffic channel utilization decreases, the number of traffic channels assigned during call establishment should be increased. By maintaining an inversely proportional relationship between traffic channel utilization and traffic channels assigned during call establishment, the RAN may be able to reduce traffic channel utilization during period of heavy load, but increase the initial quality of calls during periods of lighter load.

In addition to traffic channel utilization, the RAN may also consider the relative strength at which a WCD receives pilot signals from candidate wireless coverage areas. For example, the RAN may allocate fewer traffic channels to the WCD if the RAN is able to allocate traffic channels in wireless coverage areas from which the WCD receives strong pilot signals. Conversely, the RAN may allocate more traffic channels to the WCD if the RAN is unable to allocate traffic channels in wireless coverage areas from which the WCD receives strong pilot signals.

Figure 5:
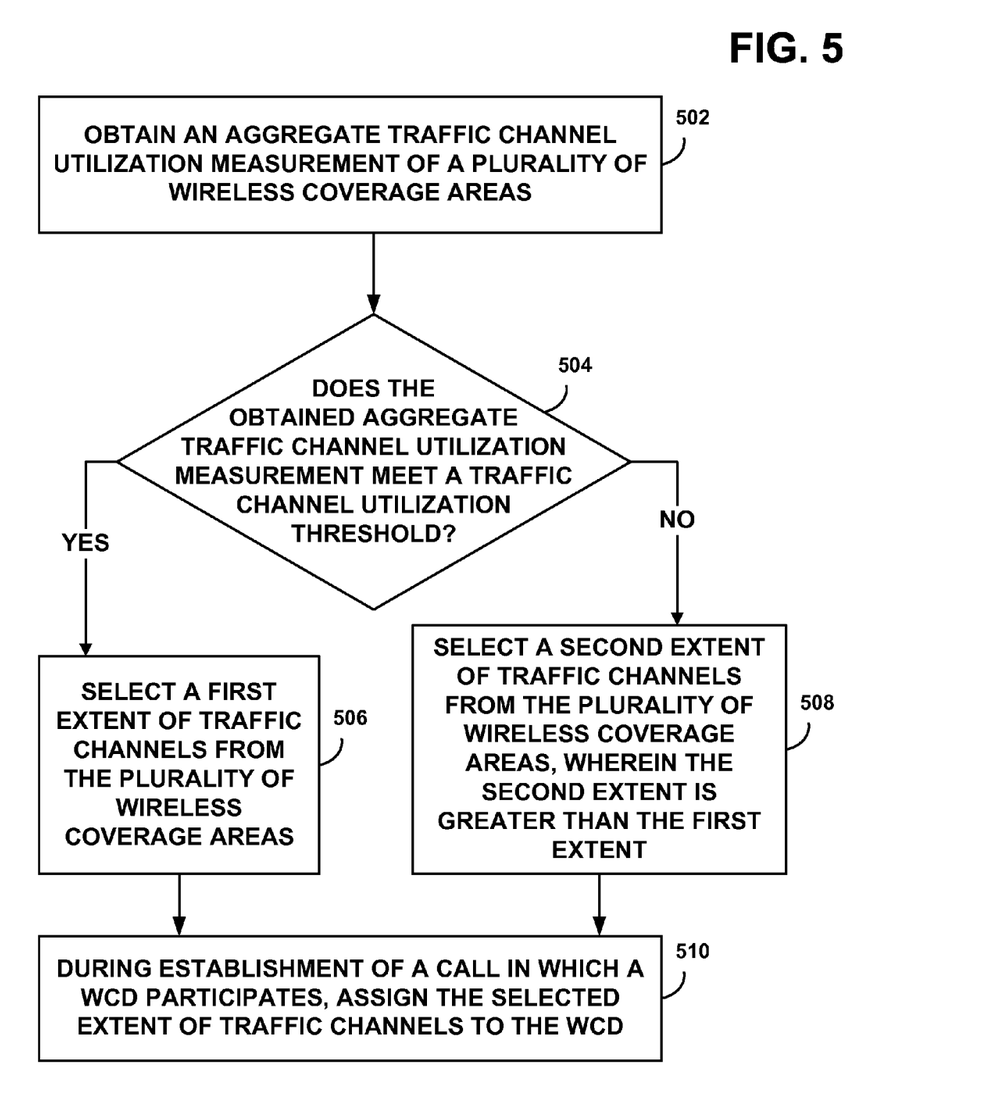
FIG. 5 is a first flow chart, in accordance with an example embodiment.
Figure 6:
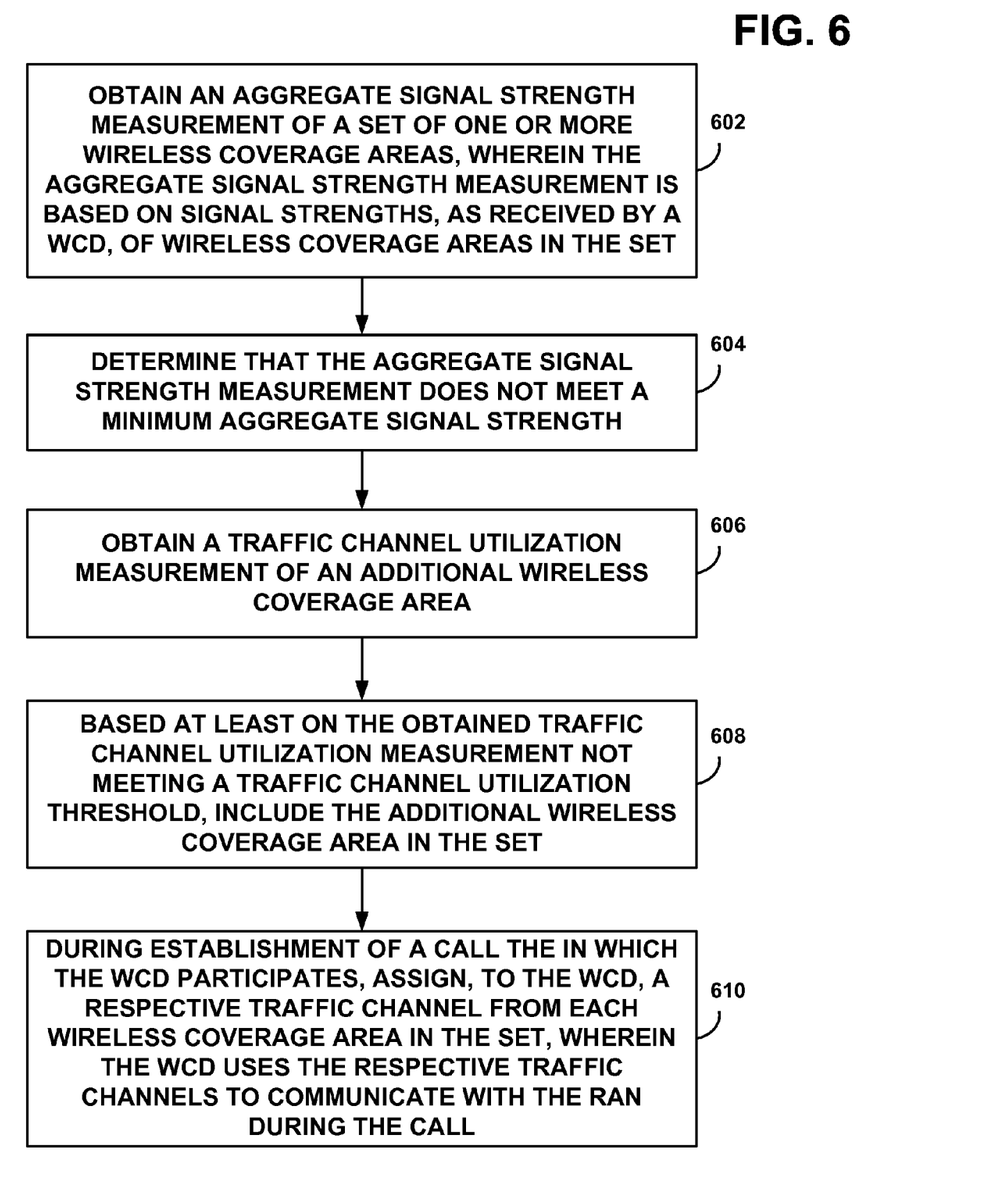
FIG. 6 is a second flow chart, in accordance with an example embodiment.

FIGS. 5 and 6 provide example embodiments through which a RAN component, such as a BSC, may allocate traffic channels to WCDs. For the example embodiment of FIG. 5, the RAN considers aggregate traffic channel utilization across multiple wireless coverage areas. For the example embodiment of FIG. 6, the RAN considers the individual traffic channel utilizations of one or more wireless coverage areas.

At step 502 of FIG. 5, a RAN may obtain an aggregate traffic channel utilization measurement of a plurality of wireless coverage areas. This aggregate traffic channel utilization measurement may be obtained based on one or more observations of traffic channel occupancy in the plurality of wireless coverage areas.

At step 504, the RAN may determine whether the obtained aggregate traffic channel utilization measurement meets a traffic channel utilization threshold. The aggregate traffic channel utilization measurement may be based on a number of traffic channels from the plurality of wireless coverage area that are assigned to WCDs. The traffic channel utilization threshold may be any utilization threshold beyond which the RAN is considered busy. For instance, the traffic channel utilization threshold may be in the range from 80% to 100%. However, the traffic channel utilization threshold could fall outside of this range instead.

If the obtained aggregate traffic channel utilization measurement meets the traffic channel utilization threshold (e.g., the traffic channels are heavily utilized), then at step 506 the RAN may select a first extent of traffic channels from the plurality of wireless coverage areas. However, if the obtained aggregate traffic channel utilization measurement does not meet the traffic channel utilization threshold (e.g., the traffic channels are lightly utilized), at step 508 the RAN may select a second extent of traffic channels from the plurality of wireless coverage areas. The second extent may be greater than the first extent. For example, the first extent of wireless coverage areas may include as little as one wireless coverage area, while the second extent of wireless coverage areas may include two or more wireless coverage areas.

At step 510, during establishment of a call in which a WCD participates, the RAN may assign the selected extent of traffic channels to the WCD. The assignment of the selected extent of traffic channels may involve transmitting one or more channel assignment messages to the WCD, wherein the channel assignment messages indicate the assigned traffic channels. In some cases, these channel assignment messages may be transmitted on control channels of wireless coverage areas from which the traffic channels have been assigned.

Additionally, the RAN may seek to ensure that the signal strengths, as received by the WCD, for each respective wireless coverage area assigned to the WCD meet a signal strength threshold. For instance, the signal strength threshold may be −10 dB. Thus, in this case, the RAN would only assign a wireless coverage area to the WCD if the WCD receives signals from the wireless coverage areas at −10 dB or more. Other signal strength thresholds could be used as well.

TABLE 1

Basing the maximum number of wireless coverage areas to assign to a WCD on aggregate traffic channel utilization.

| Aggregate Traffic Channel Utilization Range (x) | Max Wireless Coverage Areas |
|---|---|
| x > 80% | 1 |
| 80% ≥ x > 70% | 2 |
| 70% ≥ x > 60% | 3 |
| 60% ≥ x > 40% | 5 |
| 40% ≥ x | Unlimited |

The procedures illustrated by FIG. 5 may be further generalized. For instance, there may be multiple traffic channel utilization thresholds that the RAN uses to determine the extent of wireless coverage areas from which to assign traffic channels. Table 1 provides an example arrangement of traffic channel utilization thresholds mapped to a maximum number of wireless coverage areas. When the aggregate traffic channel utilization falls into a given range of Table 1, the RAN assigns no more than the associated number of wireless coverage areas. Thus, if the aggregate traffic channel utilization is above the 80% threshold, the RAN will assign a traffic channel from at most one wireless coverage area. If the aggregate traffic channel utilization is at or below the 80% threshold, but above the 70% threshold, the RAN will assign traffic channels from at most two wireless coverage areas. On the other hand, if the aggregate traffic channel utilization is at or below 40%, the RAN may assign traffic channels via an unlimited number of wireless coverage areas. In practice, however, the number of wireless coverage areas may be limited to the number of wireless coverage areas in range of the WCD.

Therefore, in an alternative embodiment, the RAN may determine the aggregate traffic channel utilization of one or more wireless coverage areas. Then, in a table or mapping containing multiple aggregate traffic channel utilizations, such as the one provided by Table 1, the RAN may look up an associated number of wireless coverage areas from which to assign traffic channels to the WCD. The RAN may subsequently proceed to assign traffic channels from these wireless coverage areas to the WCD.

FIG. 6 illustrates another example embodiment in which a RAN assembles a set of wireless coverage areas from which to assign traffic channels to a WCD. At step 602, a RAN may obtain an aggregate signal strength measurement of a set of one or more wireless coverage areas. This aggregate signal strength measurement may be based on respective signal strengths, as received by the WCD, of wireless coverage areas in the set. For instance, the aggregate signal strength measurement may be an average or a maximum of the respective signal strengths, or may be based on the average or maximum of these signal strengths.

At step 604, the RAN may determine that the aggregate signal strength measurement does not meet a minimum aggregate signal strength threshold. At step 606, which may occur in response to the RAN determining that the aggregate signal strength measurement does not meet a minimum aggregate signal strength, or for some other reason, the RAN may obtain a traffic channel utilization measurement of an additional wireless coverage area. The obtained traffic channel utilization measurement may be based on a number of traffic channels assigned to WCDs in the additional wireless coverage area. For instance, the obtained traffic channel utilization measurement may be calculated as the percentage of traffic channels from this wireless coverage area that are in use.

Based at least on the obtained traffic channel utilization measurement not meeting a traffic channel utilization threshold, at step 608 the RAN may include the additional wireless coverage area in the set. Traffic channel utilization threshold may be, for example, from 80% to 100%. Alternatively, other traffic channel utilization thresholds may be used instead.

At step 610, during establishment of the call in which the WCD participates, the RAN may assign, to the WCD, a respective traffic channel from each wireless coverage area in the set. Assigning the respective traffic channels may involve transmitting, to the WCD, a channel assignment message that indicates the respective traffic channels.

Moreover, the RAN may obtain an additional signal strength measurement, as received by the WCD, of the additional wireless coverage area. Based also on the additional signal strength measurement meeting a signal strength threshold, the RAN may include the additional wireless coverage area in the set. Regardless, the WCD may use the respective traffic channels to communicate with the RAN during the call.

TABLE 2

Traffic channel assignment based on traffic channel utilization and received signal strength.

| Traffic Channel Utilization of Wireless Coverage Area | Received Signal Strength from Wireless Coverage Area | Assign Traffic Channel from Wireless Coverage Area to WCD |
|---|---|---|
| Meets traffic channel utilization threshold | Does not meet signal strength threshold | No |
| Meets traffic channel utilization threshold | Meets signal strength threshold | No |
| Does not meet traffic channel utilization threshold | Does not meet signal strength threshold | No |
| Does not meet traffic channel utilization threshold | Meets signal strength threshold | Yes |

Table 2 illustrates an example embodiment in which the RAN determines whether to assign a traffic channel from a given wireless coverage area to a WCD. The RAN considers both the traffic channel utilization of the given wireless coverage area, and the strength at which the WCD receives signals from the given wireless coverage area. If the traffic channel utilization does not meet (e.g., is below) a traffic channel utilization threshold, and the received signal strength meets (e.g., is above) a signal strength threshold, the RAN may assign a traffic channel from the wireless coverage area to the WCD. In all other cases, the RAN may refrain from assigning a traffic channel from the wireless coverage area to the WCD.

It should be understood that the flow charts of FIGS. 5 and 6 are non-limiting embodiments. Thus, more or fewer steps than shown in FIGS. 5 and 6 may be used without departing from the scope of the invention. Additionally, each and any of these steps may be repeated one or more times, or may be omitted altogether. Moreover, these steps may occur in a different order than shown in FIGS. 5 and 6. Further, these flow charts may be combined with one another, in whole or in part, also without departing from the scope of the invention.

IV. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising:
   a radio access network (RAN) obtaining an aggregate traffic channel utilization measurement of a plurality of wireless coverage areas;
   if the obtained aggregate traffic channel utilization measurement meets a traffic channel utilization threshold, the RAN selecting a first extent of at least two traffic channels from the plurality of wireless coverage areas;
   if the obtained aggregate traffic channel utilization measurement does not meet the traffic channel utilization threshold, the RAN selecting a second extent of traffic channels from the plurality of wireless coverage areas, wherein the second extent is greater than the first extent; and during establishment of a call in which a wireless communication device (WCD) participates, the RAN assigning the selected extent of traffic channels to the WCD, wherein each assigned traffic channel is from a different wireless coverage area, and wherein the WCD uses the assigned traffic channels to communicate with the RAN during the call.

2. The method of claim 1, wherein the aggregate traffic channel utilization measurement is based on a number of traffic channels from the plurality of wireless coverage area that are assigned to WCDs.

3. The method of claim 1, wherein the traffic channel utilization threshold is from 80% to 100%.

4. The method of claim 1, wherein assigning the selected extent of traffic channels
comprises transmitting one or more channel assignment messages to the WCD, wherein the channel assignment messages indicate the assigned traffic channels.

5. The method of claim 1, wherein each signal strength, as received by the WCD, for
each respective wireless coverage area assigned to the WCD meets a signal strength threshold.

6. A method comprising:
   a radio access network (RAN) obtaining an aggregate signal strength measurement of a set of two or more wireless coverage areas, wherein the aggregate signal strength measurement is based on respective signal strengths, as received by a wireless communication device (WCD), of wireless coverage areas in the set;
   the RAN determining that the aggregate signal strength measurement does not meet minimum aggregate signal strength;
   the RAN obtaining a traffic channel utilization measurement of an additional wireless coverage area;
   based at least on the obtained traffic channel utilization measurement not meeting a traffic channel utilization threshold, the RAN including the additional wireless coverage area in the set; and
   during establishment of a call the in which the WCD participates, the RAN assigning, to the WCD, a respective traffic channel from each wireless coverage area in the set, wherein the WCD uses the respective traffic channels to communicate with the RAN during the call.

7. The method of claim 6, wherein the aggregate signal strength measurement is based on an average of the respective signal strengths.

8. The method of claim 6, wherein the aggregate signal strength measurement is based on a maximum of the respective signal strengths.

9. The method of claim 6, wherein the obtained traffic channel utilization measurement is based on a number of traffic channels assigned to WCDs in the additional wireless coverage area.

10. The method of claim 6, wherein the traffic channel utilization threshold is from 80% to 100%.

11. The method of claim 6, wherein assigning the respective traffic channels comprises transmitting a channel assignment message to the WCD, wherein the channel 20 assignment message indicates the respective traffic channels.

12. The method of claim 6, further comprising:
   the RAN obtaining an additional signal strength measurement, as received by the WCD of the additional wireless coverage area; and
   based also on the additional signal strength measurement meeting a signal strength threshold, the RAN including the additional wireless coverage area in the set.

13. An article of manufacture including a non-transitory computer-readable medium, having stored thereon program instructions that, if executed by a radio access network (RAN), cause the RAN to perform operations comprising:
   obtaining an aggregate signal strength measurement of a set of two or more wireless coverage areas, wherein the aggregate signal strength measurement is based on respective signal strengths, as received by a wireless communication device (WCD), of wireless coverage areas in the set;
   determining that the aggregate signal strength measurement does not meet a minimum aggregate signal strength;
   obtaining a traffic channel utilization measurement of an additional wireless coverage area;
   based at least on the obtained traffic channel utilization measurement not meeting a traffic channel utilization threshold, including the additional wireless coverage area in the set; and
   during establishment of a call in which the WCD participates, assigning, to the WCD, a respective traffic channel from each wireless coverage area in the set, wherein the WCD uses the respective traffic channels to communicate with the RAN during the call.

14. The article of manufacture of claim 13, wherein the aggregate signal strength measurement is based on an average of the respective signal strengths.

15. The article of manufacture of claim 13, wherein the aggregate signal strength measurement is based on a maximum of the respective signal strengths.

16. The article of manufacture of claim 13, wherein the obtained traffic channel utilization measurement is based on a number of traffic channels assigned to WCDs in the additional wireless coverage area.

17. The article of manufacture of claim 13, wherein the traffic channel utilization threshold is from 80% to 100%.

18. The article of manufacture of claim 13, wherein assigning the respective traffic channels comprises transmitting a channel assignment message to the WCD, wherein the channel assignment message indicates the respective traffic channels.

19. The article of manufacture of claim 13, wherein the computer-readable medium, has stored thereon program instructions that, if executed by the RAN, cause the RAN operations further comprising:
   obtaining an additional signal strength measurement, as received by the WCD, of the additional wireless coverage area; and based also on the additional signal strength measurement meeting a signal strength threshold, including the additional wireless coverage area in the set.

* * * * *